US012075232B2

(12) United States Patent
Enomoto

(10) Patent No.: US 12,075,232 B2
(45) Date of Patent: Aug. 27, 2024

(54) ACOUSTIC REPRODUCTION METHOD, RECORDING MEDIUM, AND ACOUSTIC REPRODUCTION SYSTEM

(71) Applicant: Panasonic Intellectual Property Corporation of America, Torrance, CA (US)

(72) Inventor: Seigo Enomoto, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 171 days.

(21) Appl. No.: 17/903,345

(22) Filed: Sep. 6, 2022

(65) Prior Publication Data

US 2022/0417697 A1 Dec. 29, 2022

Related U.S. Application Data

(63) Continuation of application No. PCT/JP2021/008539, filed on Mar. 4, 2021.

(Continued)

(30) Foreign Application Priority Data

Dec. 17, 2020 (JP) ................................ 2020-209499

(51) Int. Cl.
*H04S 7/00* (2006.01)

(52) U.S. Cl.
CPC .............. *H04S 7/303* (2013.01); *H04S 7/304* (2013.01); *H04S 2400/11* (2013.01); *H04S 2420/01* (2013.01)

(58) Field of Classification Search
CPC ...... H04S 7/303; H04S 7/304; H04S 2400/11; H04S 2420/01
See application file for complete search history.

(56) References Cited

U.S. PATENT DOCUMENTS

2020/0221243 A1* 7/2020 Schaefer ................. H04S 3/008

FOREIGN PATENT DOCUMENTS

| | | |
|---|---|---|
| JP | 8-9489 | 1/1996 |
| JP | 2018-85595 | 5/2018 |
| JP | 2020-18620 | 2/2020 |

OTHER PUBLICATIONS

International Search Report (ISR) issued on May 11, 2021 in International (PCT) Application No. PCT/JP2021/008539, 2 pages.

* cited by examiner

*Primary Examiner* — Ping Lee
(74) *Attorney, Agent, or Firm* — Wenderoth, Lind & Ponack, L.L.P.

(57) ABSTRACT

An acoustic reproduction method is an acoustic reproduction method for causing a user to perceive a first sound as a sound arriving from a first position in a three-dimensional sound field and a second sound as a sound arriving from a second position different from the first position in the three-dimensional sound field. The acoustic reproduction method includes: obtaining a movement speed of a head of the user; and generating an output sound signal for causing the user to perceive sounds that arrive from predetermined positions in the three-dimensional sound field. In the generating, when the movement speed obtained is greater than a first threshold, the output sound signal for causing the user to perceive the first sound and the second sound as a sound arriving from a third position between the first position and the second position is generated.

9 Claims, 7 Drawing Sheets

Related U.S. Application Data

(60) Provisional application No. 62/990,081, filed on Mar. 16, 2020.

ACOUSTIC REPRODUCTION METHOD, RECORDING MEDIUM, AND ACOUSTIC REPRODUCTION SYSTEM

CROSS REFERENCE TO RELATED APPLICATIONS

This is a continuation application of PCT International Application No. PCT/JP2021/008539 filed on Mar. 4, 2021, designating the United States of America, which is based on and claims priority of Japanese Patent Application No. 2020-209499 filed on Dec. 17, 2020 and U.S. Provisional Patent Application No. 62/990,081 filed on Mar. 16, 2020. The entire disclosures of the above-identified applications, including the specifications, drawings and claims are incorporated herein by reference in their entirety.

FIELD

The present disclosure relates to an acoustic reproduction system and an acoustic reproduction method.

BACKGROUND

Techniques relating to acoustic reproduction for causing a user to perceive stereophonic sounds by controlling positions of sound images that are sensory sound objects within a virtual three-dimensional space have been conventionally known (for example, see Patent Literature (PTL) 1).

CITATION LIST

Patent Literature

PTL 1: Japanese Unexamined Patent Application Publication No. 2020-18620

SUMMARY

Technical Problem

Meanwhile, production of sounds for causing a user to perceive stereophonic sounds requires a significant amount of calculation processing. However, some of conventional acoustic reproduction methods and the like have lacked performance of appropriate calculation processing.

In view of the above, the present disclosure aims to provide an acoustic reproduction method and the like for causing a user to perceive stereophonic sounds through more appropriate calculation processing.

Solution to Problem

An acoustic reproduction method according to one aspect of the present disclosure is an acoustic reproduction method for causing a user to perceive a first sound as a sound arriving from a first position in a three-dimensional sound field and a second sound as a sound arriving from a second position different from the first position in the three-dimensional sound field. The acoustic reproduction method includes: obtaining a movement speed of a head of the user; and generating an output sound signal for causing the user to perceive sounds that arrive from predetermined positions in the three-dimensional sound field. In the generating, when the movement speed obtained is greater than a first threshold, the output sound signal for causing the user to perceive the first sound and the second sound as a sound arriving from a third position between the first position and the second position is generated.

Moreover, an acoustic reproduction system according to one aspect of the present disclosure is an acoustic reproduction system for causing a user to perceive a first sound as a sound arriving from a first position in a three-dimensional sound field and a second sound as a sound arriving from a second position different from the first position in the three-dimensional sound field. The acoustic reproduction system includes: an obtainer that obtains a movement speed of a head of the user; and a generator that generates an output sound signal for causing the user to perceive sounds that arrive from predetermined positions in the three-dimensional sound field. When the movement speed obtained is greater than a first threshold, the generator generates the output sound signal for causing the user to perceive the first sound and the second sound as a sound arriving from a third position between the first position and the second position.

In addition, one aspect of the present disclosure can also be realized as a non-transitory recording medium for use in a computer, the recording medium having a computer program recorded thereon for causing a computer to execute the above-described acoustic reproduction method.

Note that these general or specific aspects may be realized by a system, a device, a method, an integrated circuit, a computer program, or a non-transitory computer-readable recording medium such as a compact disc read only memory (CD-ROM), or by any optional combination of systems, devices, methods, integrated circuits, computer programs, or recording media.

Advantageous Effect

The present disclosure is capable of causing a user to perceive stereophonic sounds through more appropriate calculation processing.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
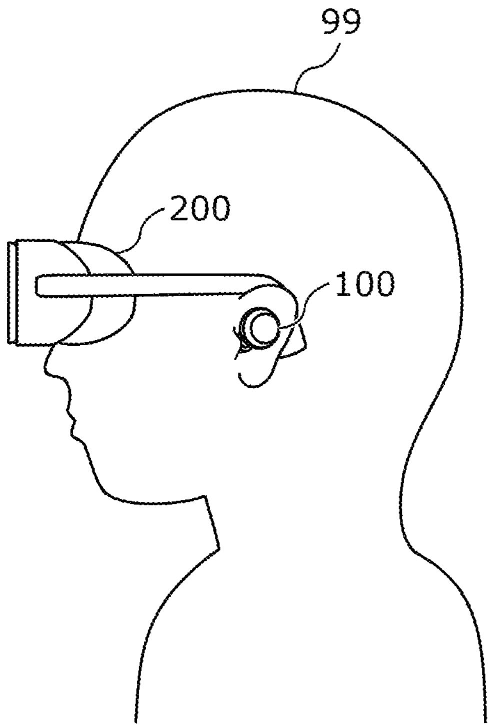
FIG. 1 is a schematic diagram illustrating a use case of an acoustic reproduction system according to an embodiment.

DESCRIPTION OF EMBODIMENTS (Underlying Knowledge Forming Basis of the Present Disclosure)

Techniques relating to acoustic reproduction for causing a user to perceive stereophonic sounds by controlling positions of sound images that are sound objects sensed by the user within a virtual three-dimensional space (hereinafter, may be called as a three-dimensional sound field) have been conventionally known (for example, see PTL 1). Localization of sound images at predetermined positions within the virtual three-dimensional space allows a user to perceive sounds as if the sounds are emitted from the predetermined positions. In order to localize sound images at the predetermined positions within a virtual three-dimensional space as described above, calculation processing for, for example, making a sound arrival time difference between both ears and a sound level difference between both ears needs to be performed on picked-up sounds such that the sounds are perceived as stereophonic sounds.

As one example of the above-described calculation processing, processing of convolving a head-related transfer function that is used for causing a sound to be perceived as arriving from a predetermined position with a signal of a target sound has been known. Performance of this processing of convolving a head-related transfer function at higher resolution enhances the sense of realism experienced by a user. On the other hand, since the load of convolving a head-related transfer function is relatively heavy for calculation processing, it requires a resource that contributes to the calculation. In other words, in order to perform processing of convolving a head-related transfer function at high resolution, it requires, for example, a high-performance calculation device and electric power associated with the use of the calculation device.

Moreover, in recent years, development of techniques relating to virtual reality (VR) has been actively taking place. The prime purpose of VR is to cause a user to experience as if the user is moving within a virtual space, without the position of a virtual three-dimensional space following the user according to a movement made by the user. Particularly, in these VR techniques, enhancement of the sense of realism is attempted by incorporating an auditory factor into a visual factor. For example, in the case where a sound image is localized in front of a user, the sound image moves to the left direction when the user turns to the right, and the sound image moves to the right direction when the user turns to the left. As described, according to a movement made by a user, a localization position of a sound image within a virtual space is required to move to a direction opposite the movement made by the user.

Enhancement of the sense of realism in a virtual space requires enhancement of spatial resolution and performance of processing of convolving a head-related transfer function. Consequently, acoustic reproduction for causing a user to perceive stereophonic sounds with enhanced sense of realism in the above-described VR and the like places more strict constraints on, for example, a calculation device, and electric power consumption.

In view of the above, in the present disclosure, more appropriate calculation processing is performed by reducing the amount of a calculation processing load, while reducing a decrease in the sense of realism. The present disclosure aims to provide an acoustic reproduction method and the like for causing a user to perceive stereophonic sounds through the above-mentioned appropriate calculation processing.

More specifically, an acoustic reproduction method according to one aspect of the present disclosure is an acoustic reproduction method for causing a user to perceive a first sound as a sound arriving from a first position in a three-dimensional sound field and a second sound as a sound arriving from a second position different from the first position in the three-dimensional sound field. The acoustic reproduction method includes: obtaining a movement speed of a head of the user; and generating an output sound signal for causing the user to perceive sounds that arrive from predetermined positions in the three-dimensional sound field. In the generating, when the movement speed obtained is greater than a first threshold, the output sound signal for causing the user to perceive the first sound and the second sound as a sound arriving from a third position between the first position and the second position is generated.

The above-described acoustic reproduction method can cause a first sound perceived as a sound arriving from a first position and a second sound perceived as a sound arriving from a second position to be perceived as a sound arriving from a third position, when a movement speed of the head of a user is greater than the first threshold. In this case, processing for localizing a sound image of a sound at the third position can be served as common processing for both processing for localizing a sound image of the first sound at the first position and processing for localizing a sound image of the second sound at the second position. Accordingly, an amount of processing can be reduced. Moreover, despite the fact that a movement speed of the head of the user exceeds the first threshold, as long as the first threshold is set to a value around which a user begins to vaguely perceive the position of a sound image, an effect on sense of realism due to a change of the position of a sound image is reduced even if the above-described processing is performed. This can also reduce the feeling of strangeness that may be experienced by a user due to a reduction in an amount of processing. From the above, the present disclosure is capable of causing a user to perceive stereophonic sounds through more appropriate calculation processing.

Moreover, for example, in the generating, the output sound signal may be generated by: when the movement speed obtained is less than or equal to the first threshold, convolving (i) a first head-related transfer function for localizing a sound at the first position with a first sound signal relating to the first sound and (ii) a second head-related transfer function for localizing a sound at the second position with a second sound signal relating to the second sound; and when the movement speed obtained is greater than the first threshold, convolving a third head-related transfer function for localizing a sound at the third position with an added sounds signal obtained by adding the second sound signal to the first sound signal.

When a sound image of a first sound is localized at a first position, a first head-related transfer function is convolved with a first sound signal relating to the first sound. When a sound image of a second sound is localized at a second position, a second head-related transfer function is convolved with a second sound signal relating to the second sound. As described above, when the sound images of the first sound and the second are localized at a third position, it needs to only perform processing of convolving a third head-related transfer function for localizing a sound at the third position with an added sounds signal obtained by adding the first sound signal and the second sound signal together. In other words, processing of convolving the third head-related transfer function with the added sounds signal can be served as common processing for processing of convolving the first head-related transfer function with the first sound signal and processing of convolving the second head-related transfer function with the second sound signal. Accordingly, an amount of processing is reduced. Therefore, the present disclosure is capable of causing a user to perceive stereophonic sounds through more appropriate calculation processing.

In addition, for example, the movement speed may be a turning speed of the head of the user turning around a first axis that passes through the head of the user. The third position may be a position on a bisector that bisects an angle formed by two straight lines connecting the user and each of the first position and the second position in an imaginary plane in the three-dimensional sound field which is viewed from a direction of the first axis.

With this, a third position set according to a turning movement of the head of a user can be used. In this case, the third position is set at a position on a bisector that bisects an angle formed by two straight lines connecting the user and each of a first position and a second position within an imaginary plane in a three-dimensional sound field which is viewed from a direction of the first axis. Accordingly, the third position can be set in a direction between the first position direction and the second position direction viewed from the user, according to a sound arrival direction that becomes vague due to a turning movement made by the user. Therefore, the present disclosure is capable of reducing the feeling of strangeness on a sound arrival direction and causing the user to perceive stereophonic sounds, while reducing an amount of processing.

Moreover, for example, the turning speed may be obtained as an amount of turns made per unit time which is detected by a detector. The detector moves together with the head of the user and detects an amount of turns made around at least one axis among three axes orthogonal to one another as a rotational axis.

With this, as the movement speed, a turning speed of the head of a user can be obtained using a detector. Therefore, based on the turning speed obtained as described above, the present disclosure is capable of reducing the feeling of strangeness on a sound arrival direction and causing a user to perceive stereophonic sounds.

In addition, for example, the movement speed may be a displacement speed of the head of the user along a second-axis direction that passes through the head of the user. The displacement speed may be obtained as an amount of displacement made per unit time which is detected by a detector. The detector moves together with the head of the user and detects an amount of displacement in a direction of at least one axis among three axes orthogonal to one another as a displacement direction.

A third position set according to a turning movement of the head of a user can be used. In this case, a displacement speed of the head of a user can be obtained using a detector. Therefore, based on the displacement speed obtained as described above, the present disclosure is capable of reducing the feeling of strangeness on a sound arrival direction and causing a user to perceive stereophonic sounds.

Moreover, for example, in the acoustic reproduction method, the user may be caused to perceive a plurality of sounds including at least the first sound and the second sound. The plurality of sounds arrive from respective positions including the first position and the second position within a predetermined area of the three-dimensional sound field. In the generating, when the movement speed is greater than the first threshold, the output sound signal for causing the user to perceive all of the plurality of sounds as a sound arriving from the third position may be generated.

With this, the present disclosure is capable of causing a user to perceive all of a plurality of sounds within a predetermined area as a sound arriving from a third position. For this reason, a head-related transfer function for localizing a sound image at the third position can be served as a common head-related transfer function for a head-related transfer function to be convolved with each of sounds within a predetermined area. Therefore, an amount of processing of convolving head-related transfer functions is reduced, and stereophonic sounds can be perceived by a user through more appropriate calculation processing.

In addition, for example, in the acoustic reproduction method, the user may be caused to perceive (i) a first middle sound as a sound arriving from a first middle position between the first position and the third position and (ii) a second middle sound as a sound arriving from a second middle position between the second position and the third position. In the generating, when the movement speed is less than or equal to the first threshold and is greater than a second threshold that is smaller than the first threshold, the output sound signal for causing the user to perceive the first middle sound and the second middle sound as a sound arriving from the third position may be further generated.

With this, the same processing as described above can be applied for a small area including a first middle position and a second middle position that are closer to a third position than to the first position and the second position, respectively. Here, since a movement speed of the head of a user is less than a first threshold, the user can perceive the change of positions of sound images if sounds at the first position, second position, etc. are collected at the third position. This may cause the user to experience a feeling of strangeness, and thus the sounds are not collected at the third position when a movement speed is less than the first threshold. However, since the movement speed of the head of the user is greater than the second threshold, the user does not perceive the change of positions of the sound images, even if sounds in a very small area smaller than a predetermined area including the first position, second position, etc. are collected at the third position. Accordingly, when a movement speed is less than or equal to the first threshold and is greater than the second threshold that is smaller than the first threshold, an amount of calculation processing can be reduced by collecting sounds of the first middle position and the second middle position at the third position. Therefore, the present disclosure is capable of causing a user to perceive stereophonic sounds through more appropriate calculation processing.

Moreover, an acoustic reproduction system according to an aspect of the present disclosure is an acoustic reproduction system for causing a user to perceive a first sound as a sound arriving from a first position in a three-dimensional sound field and a second sound as a sound arriving from a second position different from the first position in the three-dimensional sound field. The acoustic reproduction system includes: an obtainer that obtains a movement speed of a head of the user; and a generator that generates an output sound signal for causing the user to perceive sounds that arrive from predetermined positions in the three-dimensional sound field. When the movement speed obtained is greater than a first threshold, the generator generates the output sound signal for causing the user to perceive the first sound and the second sound as a sound arriving from a third position between the first position and the second position.

With this, an acoustic reproduction system that produces the same effect as the above-described acoustic reproduction method can be realized.

In addition, one aspect of the present disclosure may also be realized as a non-transitory recording medium for use in a computer, the recording medium having a computer program recorded thereon for causing a computer to execute the above-described acoustic reproduction method.

With this, the same effect produced by the above-described acoustic reproduction method can be produced using a computer.

Furthermore, these general or specific aspects may be realized by a system, a device, a method, an integrated circuit, a computer program, or a non-transitory computer-readable recording medium such as a CD-ROM, or by any optional combination of systems, devices, methods, integrated circuits, computer programs, or recording media.

Hereinafter, embodiments will be described in detail with reference to the drawings. Note that the embodiments below each describe a general or specific example. The numerical values, shapes, materials, structural elements, the arrangement and connection of the structural elements, steps, and orders of the steps, etc. presented in the embodiments below are mere examples and are not intended to limit the present disclosure. Furthermore, among the structural elements in the embodiments below, those not recited in any one of the independent claims will be described as optional structural elements. Note that the drawings are schematic diagrams, and do not necessarily provide strictly accurate illustration. Throughout the drawings, the same numeral is given to substantially the same element, and redundant description may be omitted or simplified.

In the embodiments below, ordinal numbers such as first, second, and third are given to structural elements. These ordinal numbers are given to structural elements for the purpose of distinguishing between the structural elements, and therefore do not necessarily correspond to significant orders. These ordinal numbers may be appropriately switched, newly added, or removed.

Embodiment

Overview

First, an overview of an acoustic reproduction system according to an embodiment will be described. FIG. 1 is a schematic diagram illustrating a use case of the acoustic reproduction system according to the embodiment. FIG. 1 illustrates user 99 who uses acoustic reproduction system 100.

Acoustic reproduction system 100 illustrated in FIG. 1 is simultaneously used with stereoscopic video reproduction system 200. As described above, in this embodiment, watching stereoscopic images and listening to stereophonic sounds at the same time cause the images and the sounds to respectively enhance the sense of auditory realism and visual realism, and thus a user can experience as if the user is at a site in which the images and the sounds are captured. For example, although when images (moving image) that capture a person having conversation are displayed and localization of sound images of the conversation sounds do not coincide with the person's mouth, user 99 still perceives the conversation sounds as conversation sounds uttered from the person's mouth. As described above, visual information can, for example, correct the positions of sound images, and images and sounds together may enhance the sense of realism.

Stereoscopic video reproduction system 200 is an image displaying device to be worn on the head of user 99. Accordingly, stereoscopic video reproduction system 200 moves together with the head of user 99. For example, stereoscopic video reproduction system 200 is, as illustrated in the diagram, an eye glass-type device supported by the ears and the nose of user 99.

Stereoscopic video reproduction system 200 changes an image to be displayed according to a movement of the head of user 99 to cause user 99 to perceive as if user 99 is moving their head within a three-dimensional image space. Specifically, when an object within the three-dimensional image space is located in front of user 99, the object moves to the left direction with respect to user 99 when user 99 turns to the right, and the object moves to the right direction with respect to user 99 when user 99 turns to the left. As described above, according to a movement made by user 99, stereoscopic video reproduction system 200 moves a three-dimensional image space to a direction opposite the movement made by user 99.

Stereoscopic video reproduction system 200 displays two images with parallax differences to the left and right eyes of user 99. Based on these parallax differences between the displayed images, user 99 can perceive the three-dimensional position of an object in the images. Note that cases where user 99 uses acoustic reproduction system 100 with their eyes closed, such as a case where acoustic reproduction system 100 is used to reproduce healing sounds for inducing sleep, stereoscopic video reproduction system 200 need not be simultaneously used with acoustic reproduction system 100. In other words, stereoscopic video reproduction system 200 is not an essential structural element for the present disclosure.

Acoustic reproduction system 100 is a sound presentation device to be worn on the head of user 99. Accordingly, acoustic reproduction system 100 moves together with the head of user 99. For example, acoustic reproduction system 100 consists of two earplug-type devices each independently worn in the left and right ears of user 99. These two devices communicate with each other to synchronize a sound for the right ear and a sound for the left ear to present the sounds.

Acoustic reproduction system 100 changes a sound to be presented according to a movement of the head of user 99 to cause user 99 to perceive as if user 99 is moving their head within a three-dimensional sound field. For this reason, according to a movement made by user 99, acoustic reproduction system 100 moves the three-dimensional sound field to a direction opposite the movement made by user 99 as described above.

Here, it is known that, when a movement of the head of user 99 achieves at least a fixed level, user 99 begins to vaguely identify the positions of sound images within a three-dimensional sound field. Acoustic reproduction system 100 according to the embodiment takes advantage of this occurrence to reduce the amount of a calculation processing load. Specifically, acoustic reproduction system 100 obtains a movement speed of the head of user 99. When the obtained movement speed is greater than a first threshold, acoustic reproduction system 100 causes user 99 to perceive a plurality of sounds that are to be perceived as arriving from within a predetermined area in a three-dimensional sound field as a sound arriving from one location within the predetermined area.

The above-mentioned predetermined area corresponds to a range in which user 99 begins to vaguely perceive the positions of sound images due to a movement speed of the head being fast. Accordingly, the predetermined area needs to be set for each of users 99. For example, the predetermined area is to be set by conducting an experiment etc. in advance. In addition, since this predetermined area is affected by the amount of movements made by the head of user 99, the amount of movements made by the head of user 99 may be detected for setting a predetermined area according to the amount of movements.

Similarly for a first threshold to be set for a movement speed, a value specific to user 99 which indicates from what degree of a movement speed that user 99 begins to vaguely perceive the positions of sound images needs to be set. Accordingly, a value set by conducting an experiment etc. is to be used. Note that a predetermined area and a first threshold generalized by averaging results of experiments conducted for a plurality of users 99 may be used.

Configuration

Figure 2:
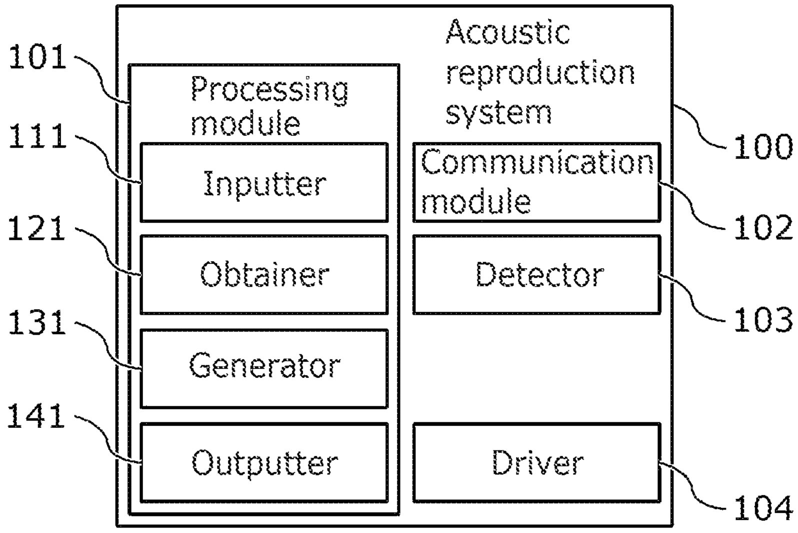
FIG. 2 is a block diagram illustrating a functional configuration of the acoustic reproduction system according to the embodiment.

Next, a configuration of acoustic reproduction system 100 according to the embodiment will be described with reference to FIG. 2. FIG. 2 is a block diagram illustrating a functional configuration of the acoustic reproduction system according to the embodiment.

As illustrated in FIG. 2, acoustic reproduction system 100 according to the embodiment includes processing module 101, communication module 102, detector 103, and driver 104.

Processing module 101 is an arithmetic device for performing various kinds of signal processing to be performed in acoustic reproduction system 100. Processing module 101 includes, for example, a processor and memory, and carries out various kinds of functions by the processor executing a program stored in the memory.

Processing module 101 includes inputter 111, obtainer 121, generator 131, and outputter 141. Details of functional units included in processing module 101 will be described below along with details of other structural elements included in processing module 101.

Communication module 102 is an interface device for receiving an input of a sound signal to acoustic reproduction system 100. Communication module 102 includes, for example, an antenna and a signal converter, and receives a sound signal from an external device via wireless communication. More specifically, communication module 102 receives, via the antenna, the wave of a radio signal indicating a sound signal that is converted into a wireless communication format, and reconverts the radio signal into the sound signal using the signal converter. Accordingly, acoustic reproduction system 100 obtains the sound signal from an external device via wireless communication. The sound signal obtained by communication module 102 is input to inputter 111. In this way, a sound signal is input to processing module 101. Note that communication between acoustic reproduction system 100 and an external device may be performed via wired communication.

A sound signal to be obtained by acoustic reproduction system 100 is encoded in a predetermined format, such as MPEG-H Audio. As one example, an encoded sound signal includes information on a sound to be reproduced by acoustic reproduction system 100 and information on a localization position for localizing a sound image of the sound at a predetermined position within a three-dimensional sound field. For example, a sound signal includes information on a plurality of sounds including a first sound and a second sound, and causes sound images created when the sounds are reproduced to be localized at different positions.

These stereophonic sounds, for example, together with images watched using stereoscopic video reproduction system 200, enhance the sense of realism of content watched and listened. Note that a sound signal may only include information on sounds. In this case, information on localization positions may be separately obtained. Moreover, although a sound signal includes a first sound signal related to a first sound and a second sound signal relating to a second sound as described above, a plurality of sound signals each separately including either the first sound signal or the second sound signal may be obtained and simultaneously reproduced to localize sound images at different positions within a three-dimensional sound field. As described above, the form of sound signals to be input is not particularly limited, as long as acoustic reproduction system 100 includes inputters 111 according to various forms of sound signals.

Detector 103 is a device for detecting a movement speed of the head of user 99. Detector 103 includes a combination of various sensors used for detecting movements, such as a gyro sensor and an acceleration sensor. In this embodiment, detector 103 is included in acoustic reproduction system 100; however, detector 103 may be included in an external device such as stereoscopic video reproduction system 200 that operates according to a movement of the head of user 99 like acoustic reproduction system 100, for example. In this case, detector 103 need not be included in acoustic reproduction system 100. In addition, as detector 103, an external image capturing device or the like may be used to capture and process images of a movement of the head of user 99 for detecting a movement made by user 99.

Detector 103 is integrally fixed to a casing of acoustic reproduction system 100, and detects a movement speed of the casing, for example. Acoustic reproduction system 100 moves together with the head of user 99 after user 99 wears acoustic reproduction system 100. Consequently, acoustic reproduction system 100 can detect a movement speed of the head of user 99.

For example, as an amount of movements made by the head of user 99, detector 103 may detect an amount of turns made around, as a rotational axis, at least one axis among three axes orthogonal to one another within a three-dimensional space, or may detect an amount of displacement in a direction of at least one axis among the three axes as a displacement direction. Moreover, as an amount of movements made by the head of user 99, detector 103 may detect both an amount of turns and an amount of displacement.

Obtainer 121 obtains a movement speed of the head of user 99 from detector 103. More specifically, obtainer 121 obtains, as a movement speed of the head of user 99, an amount of movements made by the head of user 99 which detector 103 detects per unit time. In this way, obtainer 121 obtains at least one of a turning speed and a displacement speed from detector 103.

Here, generator 131 determines whether an obtained movement speed of the head of user 99 is greater than a first threshold. Based on a result of the determination, generator 131 determines whether to reduce the amount of a calculation processing load. Details about operations performed by generator 131 will be described later. Generator 131 performs calculation processing on the input sound signal according to the above determination, and generates an output sound signal for presenting sounds.

Outputter 141 is a functional unit that outputs a generated output sound signal to driver 104. Driver 104 generates a waveform signal by, for example, converting from a digital signal into an analog signal based on the output sound signal, generates sound waves based on the waveform signal, and present user 99 with sounds. Driver 104 includes, for example, a diaphragm and a driving mechanism such as a magnet and a voice coil. Driver 104 operates the driving mechanism according to the waveform signal, and causes the diaphragm to vibrate using the driving mechanism. In this way, driver 104 generates sound waves by vibrations of the diaphragm that vibrates according to the output sound signal. The sound waves propagate through the air and are transferred to the ear of user 99. Consequently, user 99 perceives sounds.

Operation

Figure 3:
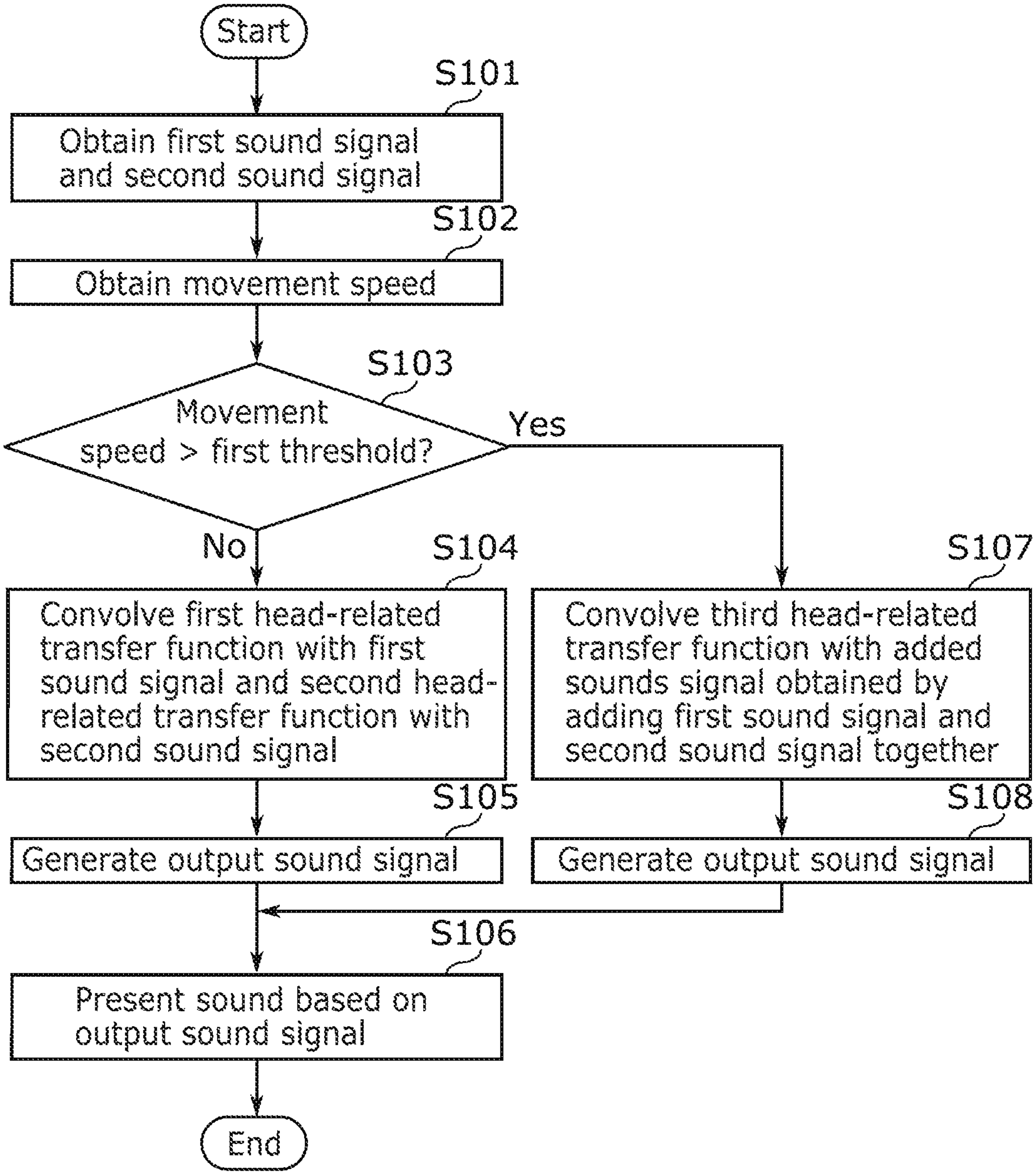
FIG. 3 is a flowchart illustrating operations performed by the acoustic reproduction system according to the embodiment.

Next, operations performed by the above-described acoustic reproduction system 100 will be described with reference to FIG. 3. FIG. 3 is a flowchart illustrating operations performed by the acoustic reproduction system according to the embodiment. As illustrated in FIG. 3, when acoustic reproduction system 100 starts operating, a first sound signal relating to a first sound and a second sound signal relating to a second sound are obtained in the first place (step S101). Here, processing module 101 obtains a sound signal including the first sound signal and the second sound signal by communication module 102 obtaining the sound signal from an external device and inputting the sound signal to inputter 111.

Next, obtainer 121 obtains a movement speed of the head of user 99 from detector 103 as a result of detection (obtaining step S102). Generator 131 compares the obtained movement speed and a first threshold, and determines whether the movement speed is greater than the first threshold (step S103). When the movement speed is less than or equal to the first threshold (No in step S103), acoustic reproduction system 100 causes user 99 to perceive the first sound and the second sound as sounds respectively arriving from a first position and a second position that are the original positions of sound images of the first sound and the second sound. For this reason, generator 131 convolves a first head-related transfer function for localizing a sound image at the first position with the first sound signal. In addition, generator 131 convolves a second head-related transfer function for localizing a sound image at the second position with the second sound signal (step S104). Generator 131 generates an output sound signal including the first sound signal and the second sound signal on which convolving processing has been performed as described above (step S105).

Alternatively, when the movement speed is greater than the first threshold (Yes in step S103), acoustic reproduction system 100 causes user 99 to perceive the first sound and the second sound as a sound arriving from a third position in a space between the first position and the second position that are the original positions of the sound images of the first sound and the second sound. For this reason, generator 131 generates an added sounds signal relating to a sound in which the first sound and the second sound are superimposed as a result of the first sound signal and the second sound signal being added together. Note that the space between the first position and the second position indicates an area interposed between an imaginary straight line that passes through the first position and the other imaginary straight line that is parallel with the imaginary straight line and passes through the second position. In this case, the above-mentioned area may include the top of the imaginary line and the top of the other imaginary line.

In addition, generator 131 convolves a third head-related transfer function for localizing a sound image at the third position with the added sounds signal (step S107). Generator 131 generates an output sound signal including the added sounds signal on which convolving processing has been performed as described above (step S108). Note that steps S103 through S108 as a whole is also called as a generation step.

Outputter 141 drives driver 104 by outputting an output sound signal generated by generator 131, and causes driver 104 to present a sound based on the output sound signal (step S106). As described above, since the first sound and the second sound together can be perceived as a sound arriving from the third position, calculation processing for localizing sound images can be simplified, compared to a case where the first sound is caused to be perceived as a sound arriving from the first position and the second sound is caused to be perceived as a sound arriving from the second position. With this, request processing performance can be temporarily reduced. Accordingly, the production of heat caused by driving of a processor, electric power consumption incident to calculation processing, and the like can be reduced. Moreover, as described above, since the position of the sound image perceived by user 99 is vague, an effect on the sense of realism is small even calculation processing is simplified. Since acoustic reproduction system 100 can simplify calculation processing as necessary as described above, acoustic reproduction system 100 is capable of causing a user to perceive stereophonic sounds through more appropriate calculation processing.

Figure 4:
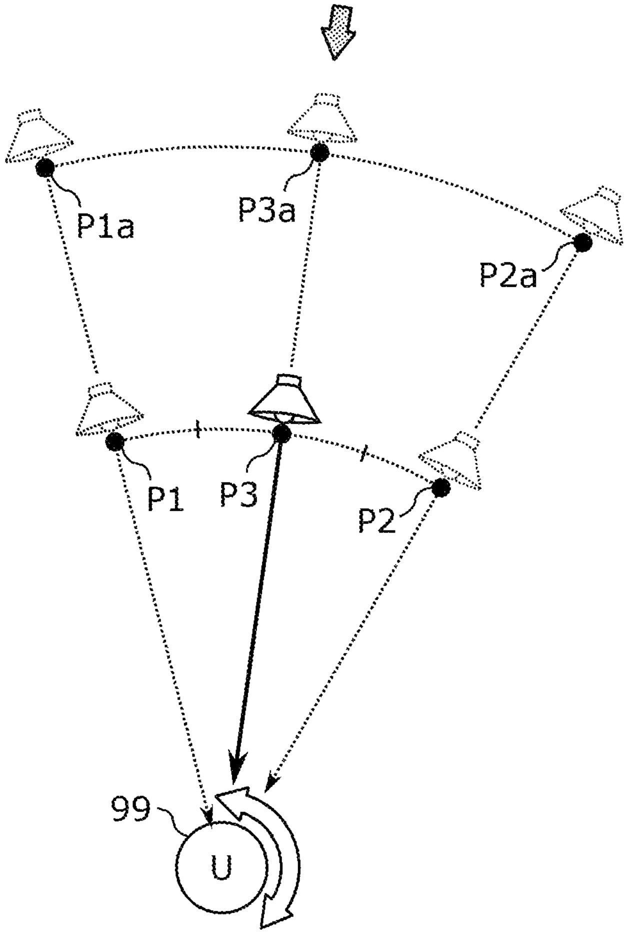
FIG. 4 is a first diagram illustrating a third position at which a sound image is localized using a third head-related transfer function according to the embodiment.

Here, the above-described third position will be described with more details with reference to FIG. 4. FIG. 4 is a diagram illustrating a third position at which a sound image is localized using a third head-related transfer function according to the embodiment. Note that in FIG. 4, black spots denote positions of sound images within a three-dimensional sound field, and arrows extending from these black spots toward user 99 denote sound arrival directions from which sounds arrive at user 99. Note that imaginary loudspeakers are illustrated together with the black spots denoting positions of sound images.

FIG. 4 exemplifies a case where user 99 is turning their head, and the turning speed of the turning is greater than a first threshold. Note that the following operations may be performed for a case where the head of user 99 is displaced and a displacement speed of the displacement is greater than the first threshold. In this example, as shown by the hollow double-pointed arrow, the head of user 99 turns around a first axis perpendicular to the plan view. In this case, as illustrated in the diagram, third position P3 or P3*a* is at a position on the bisector pointed by the arrow hatched with dots in the diagram which bisects an angle formed by a straight line connecting first position P1 or P1*a* and user 99 and a straight line connecting second position P2 or P2*a* and user 99.

As described above, simplification of calculation processing of convolving a head-related transfer function can cause user 99 to perceive stereophonic sounds through more appropriate calculation processing. Note that when a head-related transfer function includes information on a distance at which a sound image is localized, a plurality of head-related transfer functions for localizing sound images at a plurality of distances in the same sound arrival direction may be prepared, and one head-related transfer function selected among the plurality of head-related transfer functions may be convolved. In this case, arrival directions of the first sound and the second sound and distances up to the positions of sound images of the first sound and the second sound are averaged, and user 99 tends to experience a feeling of strangeness. Accordingly, a means that, for example, sets a very small predetermined area for reducing the feeling of strangeness may be further included.

The following exemplifies the case where the head of user 99 is displaced, and a displacement speed of the displacement is greater than the first threshold. In this example, the head of user 99 displaces along a second axis in the up-down direction along the plan view, for example. In this case, third position P3 is at a position on an equidistant curve which is orthogonal to the second-axis direction and in which a distance between first position P1 and third position P3 and a distance between second position P2 and third position P3 are equal. Localization of a sound image at the above-described position can set an average third position P3 in an area at a distance where discrimination becomes vague according to displacement of the head of user 99. Note that a displacement direction of the head of user 99 may be one direction.

In addition, when a third position is set, the third position may be set at a position corresponding to either one of the first position or the second position. For example, when the first sound is a line spoken by a person in content and the second sound is an environmental sound in the content, the first sound is given a high priority, and the position of a sound image set for the first sound is set as the third position. With this, the first sound and the second sound are perceived as a sound arriving from the first position that is set as the third position. In this case, the first head-related transfer function for causing user 99 to perceive a sound as a sound arriving from the first position is used as is.

Specifically, in this example, a head-related transfer function that has been already used is used. Accordingly, it is not necessary to set, as the third position, a position not corresponding to any of positions of sound images such as a first position and a second position which have been already set by a sound signal as described in the above example, for example. In other words, a position of a sound image originally set by a sound signal can be set as the third position. For this reason, a head-related transfer function for localizing a sound image at the position of a sound image which has been originally set can be used. Accordingly, it is not necessary to use mapping information or the like in which head-related transfer functions each used for user 99 to perceive a sound as a sound arriving from an optional point within a three-dimensional sound field are mapped. Accordingly, processing of determining a head-related transfer function for the third position that is set is simplified. Therefore, it is possible to cause user 99 to perceive stereophonic sounds through more appropriate calculation processing. As described above, a space between the first position and the second position indicates a range including the first position and the second position themselves.

In addition, as the third position, a midpoint on a line segment spatially connecting the first position and the second position may be set, or a random position between the first position and the second position may be simply set.

Variation

Hereinafter, operations of an acoustic reproduction system according to a variation of the embodiment will be described with reference to FIG. 5 and FIG. 6A through FIG. 6C. Note that the variation of the embodiment mainly describes points different from the above-described embodiment, and descriptions on points substantially the same as the above-described embodiment will be omitted or simplified.

Figure 5:
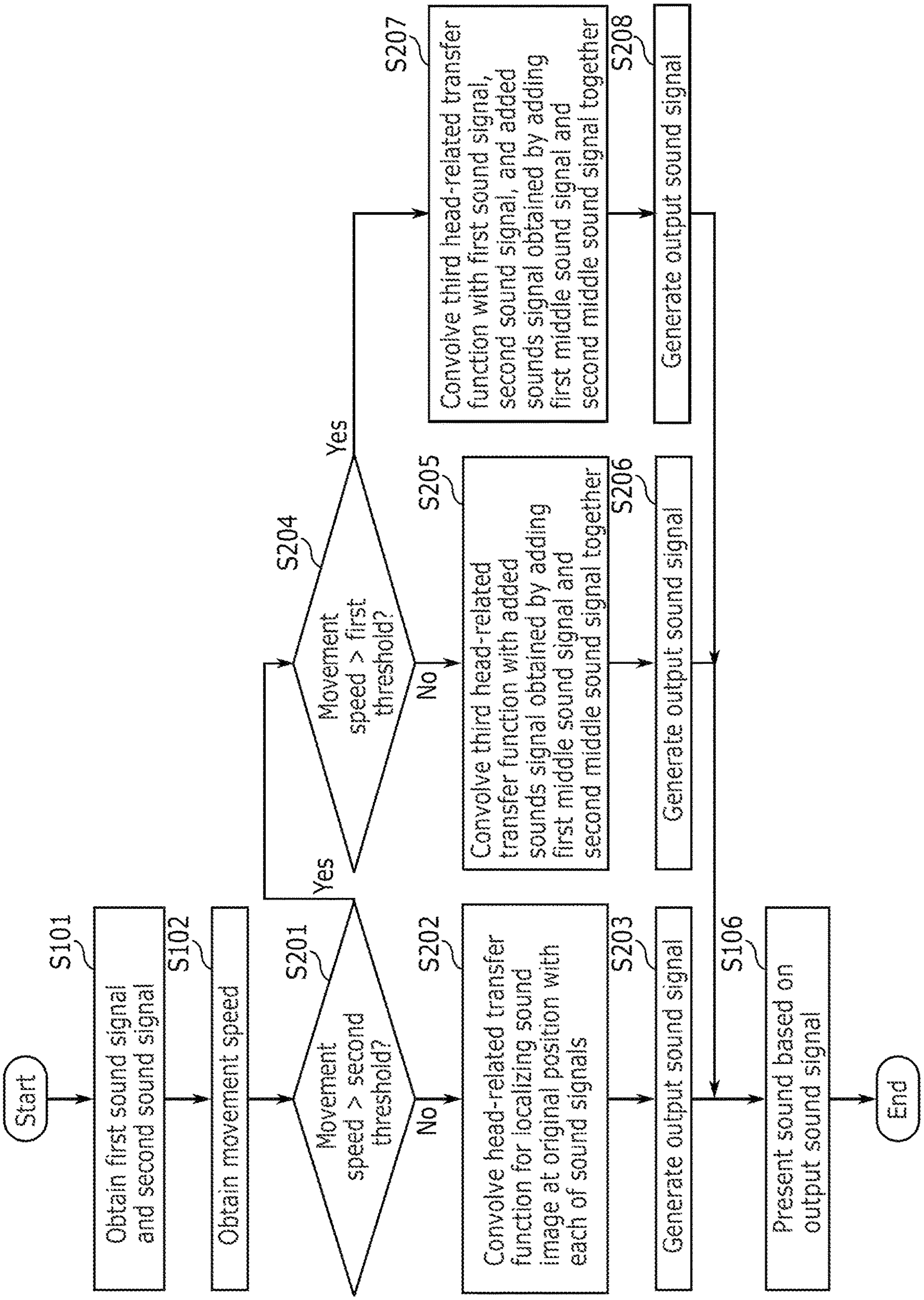
FIG. 5 is a flowchart illustrating operations performed by an acoustic reproduction system according to a variation of the embodiment.
Figure 6A:
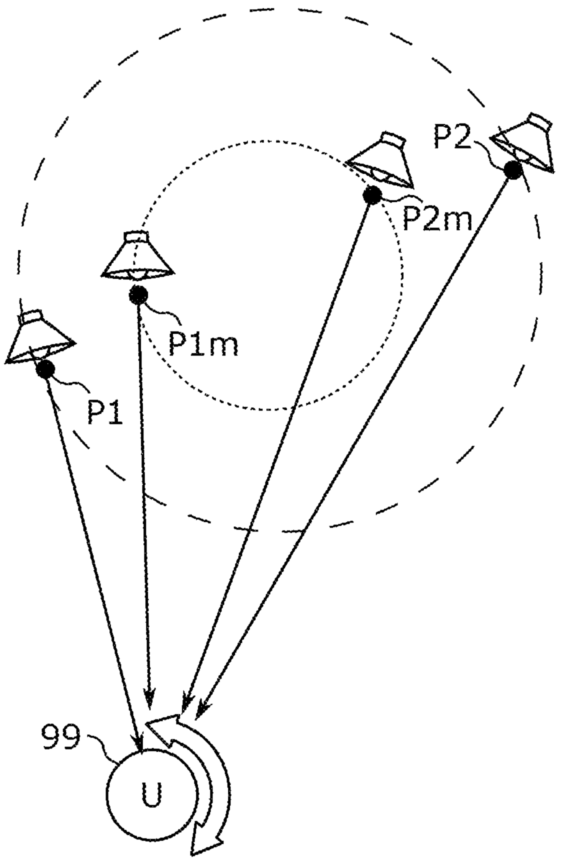
FIG. 6A is a first diagram illustrating a third position at which a sound image is localized using a third head-related transfer function according to the variation of the embodiment.
Figure 6B:
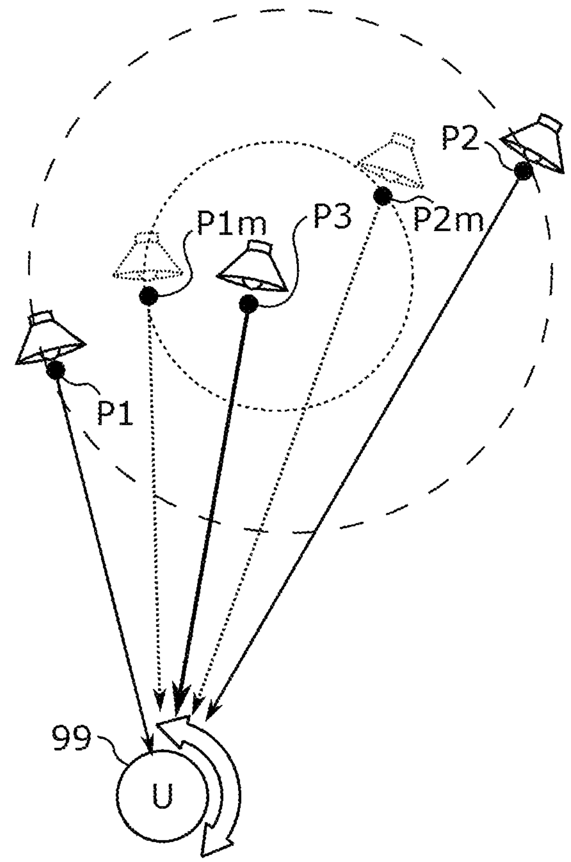
FIG. 6B is a second diagram illustrating a third position at which a sound image is localized using a third head-related transfer function according to the variation of the embodiment.
Figure 6C:
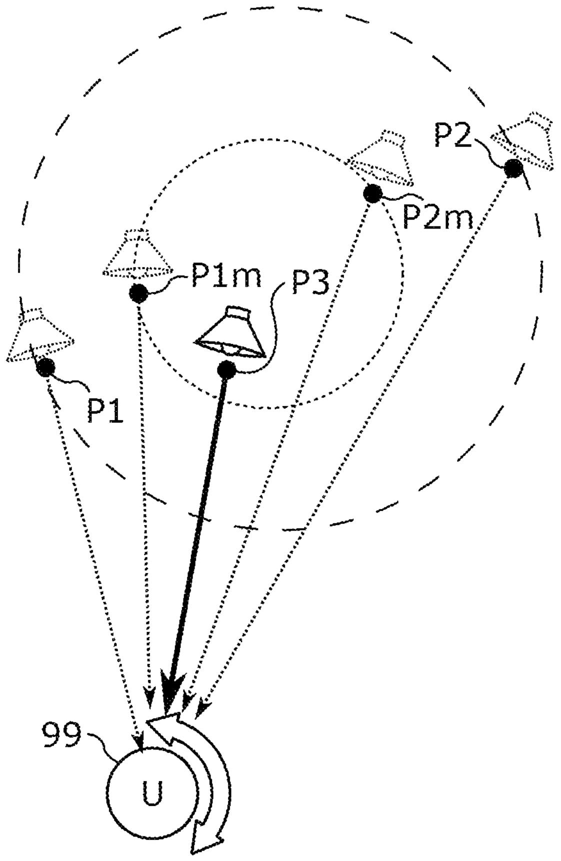
FIG. 6C is a third diagram illustrating a third position at which a sound image is localized using a third head-related transfer function according to the variation of the embodiment.

FIG. 5 is a flowchart illustrating operations performed by an acoustic reproduction system according to a variation of the embodiment. FIG. 6A is a first diagram illustrating a third position at which a sound image is localized using a third head-related transfer function according to the variation of the embodiment. FIG. 6B is a second diagram illustrating a third position at which a sound image is localized using a third head-related transfer function according to the variation of the embodiment. FIG. 6C is a third diagram illustrating a third position at which a sound image is localized using a third head-related transfer function according to the variation of the embodiment. Compared to acoustic reproduction system 100 according to the above-described embodiment, the acoustic reproduction system according to the variation is different in that a target sound signal with which a head-related transfer function is convolved changes according to a first threshold and a second threshold.

More specifically, in the acoustic reproduction system according to the variation, a second threshold less than a first threshold is set. In the same manner as the above-described embodiment, the first threshold is used for determining whether or not to apply a third head-related transfer function for causing user 99 to perceive a first sound and a second sound as a sound arriving from a third position. Furthermore, according to a determination using the second threshold, a third head-related transfer function for causing user 99 to perceive, as a sound arriving from the third position, a first middle sound and a second middle sound respectively localized at a first middle position and a second middle position which are closer to the third position than to positions at which a first sound and a second sound are localized is convolved to realize a reduction in an amount of calculation processing in this variation.

Here, a determination based on a movement speed of the head of user 99 is made. When the movement speed is less than or equal to the second threshold, the first sound is localized at first position P1, the second sound is localized at second position P2, the first middle sound is localized at first middle position P1*m* (see FIG. 6A through FIG. 6C), and the second middle sound is localized at second middle position P2*m* (see FIG. 6A through FIG. 6C). Alternatively, when the movement speed of the head of user 99 is greater than the first threshold, processing of convolving a third head-related transfer function with sound signals (i.e., a first sound signal and a second sound signal) relating to the first sound and the second sound is applied as described above. In this case, the third head-related transfer function is also convolved with sound signals (i.e., a first middle sound signal and a second middle sound signal) relating to the first middle sound and the second middle sound, and all of the first sound, the second sound, the first middle sound, and the second middle sound are localized at third position P3.

In addition, when the movement speed of the head of user 99 is greater than the second threshold and is less than or equal to the first threshold, the first sound is localized at first position P1, the second sound is localized at second position P2, and the first middle sound and the second middle sound are localized at third position P3 in this variation. In other words, in this variation, when a movement speed of the head of user 99 is not so fast, like a case where a movement speed of the head of user 99 is less than or equal to the second threshold, calculation processing of convolving a head-related transfer function is simplified for a smaller predetermined area (i.e., a very small area) that does not include first position P1 and second position P2 and includes first middle position P1*m* and second middle position P2*m*.

As operations performed by the acoustic reproduction system according to the variation, after obtainer 121 obtains a movement speed (step S102), generator 131 determines whether the movement speed is greater than the second threshold (step S201), as illustrated in FIG. 5. When the movement speed is less than or equal to the second threshold (No in step S201), the processing moves on to step S202. In the same manner as the above-described embodiment, an operation of convolving a head-related transfer function for localizing a sound image at a position at which the sound image is to be originally localized is performed for each of sound signals (step S202). Specifically, a first head-related transfer function for localizing a sound image at first position P1 is convolved with a first signal relating to a first sound, a second head-related transfer function for localizing a sound image at second position P2 is convolved with a second signal relating to a second sound, a first middle head-related transfer function for localizing a sound image at first middle position P1*m* is convolved with a first middle sound signal relating to a first middle sound, and a second middle head-related transfer function for localizing a sound image at second middle position P2*m* is convolved with a second middle sound signal relating to a second middle sound.

Alternatively, when the movement speed is greater than the second threshold (Yes in step S201), generator 131 further determines whether the movement speed is greater than the first threshold (step S204). When the movement speed is less than or equal to the first threshold (No in step S204), acoustic reproduction system 100 causes user 99 to perceive the first middle sound and the second middle sound as a sound arriving from the third position. For this reason, generator 131 convolves a third head-related transfer function with an added sounds signal obtained by adding the first middle sound relating to the first middle sound and the second middle sound relating to the second middle sound together (step S205). Generator 131 generates an output sound signal including the following signals on which convolving processing has been performed as described above: the first sound signal, the second sound signal, and the added sounds signal obtained by adding the first middle sound signal and the second middle sound signal together (step S206). Thereafter, the processing moves on to step S106, and the same operations as described in the above-described embodiment will be performed.

Alternatively, when the movement speed is greater than the first threshold (Yes in step S204), the processing moves on to step S207. Through the same operation performed in the above-described embodiment, processing of convolving a third head-related transfer function with the added sounds signal obtained by adding the first sound signal and the second sound signal together is performed. In this variation, the first middle sound signal and the second middle sound signal are further added to this added sounds signal. Accordingly, the first sound, the second sound, the first middle sound, and the second middle sound are perceived by user 99 as a sound arriving from third position P3.

As a result of the above-described operations, sound images as illustrated in FIG. 6A are generated within a three-dimensional sound field when a movement speed of user 99 is less than or equal to the second threshold in the acoustic reproduction system according to the variation of the embodiment. Note that, in the same manner as FIG. 4, FIG. 6A is a diagram in which the three-dimensional sound field is viewed from the first-axis direction. As illustrated in FIG. 6A, when a movement speed of user 99 is less than or equal to the second threshold, each of the first sound, the second sound, the first middle sound, and the second middle sound is perceived by user 99 as a sound arriving from the original position of the sound image.

Moreover, in the acoustic reproduction system according to the variation, sound images as illustrated in FIG. 6B are generated within a three-dimensional sound field when a movement speed of user 99 is less than or equal to the first threshold and is greater than the second threshold. Note that, in the same manner as FIG. 4, FIG. 6B is a diagram in which the three-dimensional sound field is viewed from the first-axis direction.

As illustrated in FIG. 6B, when a movement speed of user 99 is less than or equal to the first threshold and is greater than the second threshold, the first middle sound that is originally perceived by user 99 as a sound arriving from first middle position P1*m* that is closer to third position P3 than to first position P1 is perceived by user 99 as a sound arriving from third position P3. Likewise, when the movement speed of user 99 is less than or equal to the first threshold and is greater than the second threshold, the second middle sound that is originally perceived by user 99 as a sound arriving from second middle position P2*m* that is closer to third position P3 than to second position P2 is perceived by user 99 as a sound arriving from third position P3.

Furthermore, in the acoustic reproduction system according to the variation, sound images as illustrated in FIG. 6C are generated within a three-dimensional sound field when a movement speed of user 99 is greater than the first threshold. Note that, in the same manner as FIG. 4, FIG. 6C is a diagram in which the three-dimensional sound field is viewed from the first-axis direction.

As illustrated in FIG. 6C, when a movement speed of user 99 is greater than the first threshold, all of sounds to be originally localized at positions of sound images included in a predetermined area including first position P1 and second position P2 as well as first middle position P1*m* and second middle position P2*m* are perceived by user 99 as a sound arriving from third position P3.

In this way, when a movement speed exceeds the second threshold, sounds in a predetermined area having a size in which a movement speed made by user 99 is associated with levels are perceived by user 99 as a sound arriving from third position P3. For example, in the diagram, sounds within the predetermined area encircled by the long, dashed line are perceived by user 99 as a sound arriving from third position P3, when a movement speed exceeds the first threshold. In addition, when a movement speed exceeds the second threshold and is less than or equal to the first threshold, sounds within a very small predetermined area (i.e., very small area) encircled by the dashed line are perceived by user 99 as a sound arriving from third position P3.

Note that, as third position P3, first middle position P1*m* and second middle position P2*m* are taken into consideration in this case. Specifically, third position P3 is set based on four positions, which are first position P1, second position P2, first middle position P1*m*, and second middle position P2*m*. Here, for example, the following position is set as third position P3: a position (i) on a straight line connecting user 99 and the center between first position P1, second position P2, first middle position P1*m*, and second middle position P2*m* and (ii) at a distance same as the shortest distance among distances between the position of user 99 and each of first position P1, second position P2, first middle position P1*m*, and second middle position P2*m*. Moreover, third position P3 may be set in the average coordinates of coordinates corresponding to the four positions within plane coordinates viewed from the first-axis direction.

Note that three or more levels such as a third threshold set for a movement speed of user 99 may be further set, and sounds within an even smaller predetermined area may be perceived by user 99 as a sound arriving from third position P3. The number of levels in a relationship between a movement speed and the size of a predetermined area is not particularly limited.

In addition, in the same manner as the first threshold in the above-described embodiment, the second threshold may be set based on a value specific to user 99 which indicates from what degree of a movement speed that user 99 begins to vaguely perceive the position of a sound image, or a typical value may be set.

Other Embodiments

Hereinbefore, embodiments have been described; however, the present disclosure is not limited to these embodiments.

For example, the above-described embodiments have presented an example in which a sound does not follow a movement of the head of a user; however, the present disclosure is also effective in a case in which a sound follows a movement of the head of a user. Specifically, when a movement speed of the head is greater than a first threshold in operations for causing the user to perceive a first sound as a sound arriving from a first position that relatively shifts along with a movement of the head of the user and a second sound as a sound arriving from a second position that relatively shifts along with a movement of the head of the user, the first sound and the second sound are caused to be perceived as a sound arriving from a third position that relatively shifts along with a movement of the head of the user.

In this case, processing of convolving head-related transfer functions for localizing the first sound and the second sound at the first position and the second position with sound signals is also performed. Since a common head-related transfer function to be convolved with a sound signal is used when a movement speed exceeds the first threshold, calculation processing is simplified. In other words, in the similar manner as the above-described embodiment, request processing performance can be temporarily reduced. Accordingly, the production of heat caused by driving of a processor, electric power consumption incident to calculation processing and the like can be reduced. Also, although the above-described calculation processing is simplified, it is difficult for a user to correctly perceive a position of a sound image when a movement speed of the head of the user is fast. Accordingly, a feeling of strangeness that the user experience on the position of a sound image is unlikely to be increased. Therefore, it is possible to cause a user to perceive stereophonic sounds through more appropriate calculation processing.

Moreover, for example, the acoustic reproduction system described in the above embodiments may be realized as a single device including every structural element, or may be realized by a plurality of devices each of which is assigned a function operating in conjunction with one another. In the case of the latter, an information processing device such as a smartphone, a tablet terminal, or a personal computer (PC), may be used as a device corresponding to a processing module.

Furthermore, the acoustic reproduction system according to the present disclosure can also be realized as an acoustic processing device that is connected to a reproduction device provided with only a driver, and only outputs an output sound signal on which processing of convolving a head-related transfer function is performed based on an obtained sound signal to the reproduction device. In this case, the acoustic processing device may be realized as a hardware product including a dedicated circuit, or may be realized as a software program for causing a general-purpose processor to execute particular processing.

Moreover, in the above embodiments, processing that is performed by a specific processor may be performed by another processor. In addition, the order of a plurality of processes may be changed, and the plurality of processes may be performed in parallel.

In the above-described embodiments, each structural element may be realized by executing a software program suitable for the structural element. Each structural element may be realized as a result of a program execution unit, such as a CPU or processor or the like, loading and executing a software program stored in a storage medium such as a hard disk or semiconductor memory.

Each structural element may be realized by a hardware product. For example, each structural element may be a circuit (or an integrated circuit). These circuits may constitute a single circuit as a whole or may be individual circuits. Moreover, these circuits may be general-purpose circuits, or dedicated circuits.

These general and specific aspects of the present disclosure may be realized using a system, a device, a method, an integrated circuit, a computer program, or a computer-readable recording medium such as a CD-ROM. In addition, these general and specific aspects of the present disclosure may be realized using any optional combination of systems, devices, methods, integrated circuits, computer programs, and computer-readable recording media.

For example, the present disclosure may be realized as an audio signal reproduction method to be executed by a computer, or a program for causing a computer to execute the audio signal reproduction method. The present disclosure may also be realized as a non-transitory computer-readable recording medium on which such a program is recorded.

The present disclosure also encompasses: embodiments achieved by applying various modifications conceivable to those skilled in the art to each embodiment; and embodiments achieved by optionally combining the structural elements and the functions of each embodiment without departing from the essence of the present disclosure.

INDUSTRIAL APPLICABILITY

The present disclosure is useful for acoustic reproduction for causing a user to perceive stereophonic sounds which involves a movement of the head of a user.

The invention claimed is:

1. An acoustic reproduction method for causing a user to perceive a first sound as a sound arriving from a first position in a three-dimensional sound field and a second sound as a sound arriving from a second position different from the first position in the three-dimensional sound field, the acoustic reproduction method comprising:

obtaining a movement speed of a head of the user; and generating an output sound signal for causing the user to perceive sounds that arrive from predetermined positions in the three-dimensional sound field, wherein in the generating, when the movement speed obtained is greater than a first threshold, the output sound signal for causing the user to perceive the first sound and the second sound as a sound arriving from a third position between the first position and the second position is generated.

2. The acoustic reproduction method according to claim 1, wherein in the generating, the output sound signal is generated by:

when the movement speed obtained is less than or equal to the first threshold, convolving (i) a first head-related transfer function for localizing a sound at the first position with a first sound signal relating to the first sound and (ii) a second head-related transfer function for localizing a sound at the second position with a second sound signal relating to the second sound; and when the movement speed obtained is greater than the first threshold, convolving a third head-related transfer function for localizing a sound at the third position with an added sounds signal obtained by adding the second sound signal to the first sound signal.

3. The acoustic reproduction method according to claim 1, wherein the movement speed is a turning speed of the head of the user turning around a first axis that passes through the head of the user, and the third position is a position on a bisector that bisects an angle formed by two straight lines connecting the user and each of the first position and the second position in an imaginary plane in the three-dimensional sound field which is viewed from a direction of the first axis.

4. The acoustic reproduction method according to claim 3, wherein the turning speed is obtained as an amount of turns made per unit time which is detected by a detector, the detector moving together with the head of the user and detecting an amount of turns made around at least one axis among three axes orthogonal to one another as a rotational axis.

5. The acoustic reproduction method according to claim 1, wherein the movement speed is a displacement speed of the head of the user along a second-axis direction that passes through the head of the user, and the displacement speed is obtained as an amount of displacement made per unit time which is detected by a detector, the detector moving together with the head of the user and detecting an amount of displacement in a direction of at least one axis among three axes orthogonal to one another as a displacement direction.

6. The acoustic reproduction method according to claim 1, wherein in the acoustic reproduction method, the user is caused to perceive a plurality of sounds including at least the first sound and the second sound, the plurality of sounds arriving from respective positions including the first position and the second position within a predetermined area of the three-dimensional sound field, and in the generating, when the movement speed is greater than the first threshold, the output sound signal for causing the user to perceive all of the plurality of sounds as a sound arriving from the third position is generated.

7. The acoustic reproduction method according to claim 1, wherein in the acoustic reproduction method, the user is caused to perceive (i) a first middle sound as a sound arriving from a first middle position between the first position and the third position and (ii) a second middle sound as a sound arriving from a second middle position between the second position and the third position, and in the generating, when the movement speed is less than or equal to the first threshold and is greater than a second threshold that is smaller than the first threshold, the output sound signal for causing the user to perceive the first middle sound and the second middle sound as a sound arriving from the third position is further generated.

8. A non-transitory computer-readable recording medium for use in a computer, the recording medium having a computer program recorded thereon for causing the computer to execute the acoustic reproduction method according to claim 1.

9. An acoustic reproduction system for causing a user to perceive a first sound as a sound arriving from a first position in a three-dimensional sound field and a second sound as a sound arriving from a second position different from the first position in the three-dimensional sound field, the acoustic reproduction system comprising:

an obtainer that obtains a movement speed of a head of the user; and a generator that generates an output sound signal for causing the user to perceive sounds that arrive from predetermined positions in the three-dimensional sound field, wherein when the movement speed obtained is greater than a first threshold, the generator generates the output sound signal for causing the user to perceive the first sound and the second sound as a sound arriving from a third position between the first position and the second position.

* * * * *